US009242872B2

(12) United States Patent
Reddy

(10) Patent No.: US 9,242,872 B2
(45) Date of Patent: Jan. 26, 2016

(54) PREPARATION OF GREEN COLORANT FROM MIXED RARE EARTH AND MOLYBDENUM COMPOUNDS AND PROCESS OF SURFACE COATINGS THEREOF

(75) Inventor: Mundlapudi Lakshmipathi Reddy, Thiruvananthapuram (IN)

(73) Assignee: Council of Scientific & Industrial Research, New Delhi, IN (US)

( * ) Notice: Subject to any disclaimer, the term of this patent is extended or adjusted under 35 U.S.C. 154(b) by 1156 days.

(21) Appl. No.: 13/260,481

(22) PCT Filed: Mar. 29, 2010

(86) PCT No.: PCT/IN2010/000195
§ 371 (c)(1),
(2), (4) Date: Jan. 6, 2012

(87) PCT Pub. No.: WO2010/109493
PCT Pub. Date: Sep. 30, 2010

(65) Prior Publication Data
US 2012/0100769 A1 Apr. 26, 2012

(30) Foreign Application Priority Data
Mar. 27, 2009 (IN) .............................. 623/DEL/2009

(51) Int. Cl.
*C09C 1/00* (2006.01)
*B05D 7/00* (2006.01)
(Continued)

(52) U.S. Cl.
CPC ........... *C01G 39/006* (2013.01); *C01P 2002/72* (2013.01); *C01P 2004/61* (2013.01); *C01P 2006/60* (2013.01); *C01P 2006/62* (2013.01); *C01P 2006/63* (2013.01); *C01P 2006/64* (2013.01); *C01P 2006/88* (2013.01); *Y10T 442/20* (2015.04)

(58) Field of Classification Search
CPC .............. C01G 39/006; C01P 2002/72; C01P 2004/61; C01P 2006/60; C01P 2006/62; C01P 2006/63; C01P 2006/64; C01P 2006/88; Y10T 442/20
See application file for complete search history.

(56) References Cited

U.S. PATENT DOCUMENTS 5,501,733 A 3/1996 Macaudiere et al.
6,284,033 B1 9/2001 Chopin et al.
(Continued)

FOREIGN PATENT DOCUMENTS

WO WO 2006/067799 6/2006
WO WO 2010/109493 9/2010

OTHER PUBLICATIONS

Brixner et al. (Sep. 1, 1972) "Ln$_2$MoO$_6$-Type Rare Earth Molybdates—Preparation and Lattice Parameters," *J. Solid State Chem.* 5(2):186-190.
(Continued)

*Primary Examiner* — Shuangyi Abu Ali
(74) *Attorney, Agent, or Firm* — Lathrop & Gage LLP

(57) ABSTRACT

The present invention proposes the development of inorganic green pigment, having a general formula, $RE_2MoO_6$ (where RE is mixed rare earth metal and Mo is molybdenum metal) comprising mixed rare earth elements having atomic number in the range of 57 to 66 and having a composition of at least lanthanum in the range of 43-45% w/w, neodymium in the range of 33-35% w/w, praseodymium in the range of 9-10% w/w, samarium in the range of 4-5% w/w and other rare earths to a maximum of 5% w/w and molybdenum. The colorant can be prepared in a convenient and inexpensive method utilizing the solid state route by calcining the mixed rare earth carbonate and ammonium molybdate at a temperature range of 900-1100° C. for 3-6 h at a heating rate of 10° C./min followed by grinding. The well ground calcined powders were used for characterization of the pigments. The phase purity and optical properties of the prepared pigments were investigated. The pigment is useful as a colorant to various substrate materials such as plastics, paints, ceramics and the like.

9 Claims, 4 Drawing Sheets

(51) Int. Cl.
    *C04B 14/20*     (2006.01)
    *C09C 1/02*     (2006.01)
    *C04B 14/04*     (2006.01)
    *C09C 1/34*     (2006.01)
    *C09C 1/36*     (2006.01)
    *C09C 1/04*     (2006.01)
    *C09C 1/22*     (2006.01)
    *C01G 39/00*     (2006.01)

(56) References Cited

U.S. PATENT DOCUMENTS

| | | | |
|---|---|---|---|
| 6,582,814 | B2 | 6/2003 | Swiler et al. |
| 7,279,036 | B2 * | 10/2007 | Kalarical et al. ............... 106/400 |
| 2008/0247933 | A1 | 10/2008 | Rao et al. |

OTHER PUBLICATIONS

Garrote et al. (Jul. 20, 2006) "New Inorganic Pigments in the Ca-Nd-S System: Stabilization of $_\gamma$Phase," *J. Alloys Compounds* 418(1-2):86-89.

Hernandez et al. (Jul. 12, 2001) "New Ecological Pigments in the Ca-Yb-S System," *J. Alloys Compounds* 323-324:297-302.

International Search Report and Written Opinion, Corresponding to International Application No. PCT/IN2010/000195, Mailed Jul. 22, 2010.

Pandita et al. (Oct. 1, 2001) "Crystallization of Mixed Rare Earth Molybdates in Silica Gel," *Bull. Mater. Sci.* 24(5):435-440.

Sreeram et al. (Nov. 1, 2008) "Colored Cool Colorants Based on Rare Earth Metal Ions," *Solar Energy Mater. Solar Cells* 92(11):1462-1467.

* cited by examiner

PREPARATION OF GREEN COLORANT FROM MIXED RARE EARTH AND MOLYBDENUM COMPOUNDS AND PROCESS OF SURFACE COATINGS THEREOF

CROSS-REFERENCE TO RELATED APPLICATIONS

This application is the U.S. National Stage of International Application No. PCT/IN2010/000195, filed Mar. 29, 2010, which claims the benefit of Indian Patent Application 623/DEL/2009, filed Mar. 27, 2009, both of which are hereby incorporated by reference to the extent not inconsistent with the disclosure herewith.

FIELD OF THE INVENTION

The present invention relates to a new inorganic green colorant having a general formula, $RE_2MoO_6$ (where RE is mixed rare earth metal and Mo is molybdenum metal) from mixed rare earth and molybdenum compounds and process of surface coatings thereof. The mixed rare earth compounds selected from carbonate of rare earth elements having atomic number in the range of 57 to 66 and having a composition lanthanum in the range of 43-45% w/w, neodymium in the range of 33-35% w/w, praseodymium in the range of 9-10% w/w, samarium in the range of 4-5% w/w and other rare earths to a maximum of 5% w/w and ammonium molybdate. More specifically, the present invention provides a product and process for the preparation of inorganic green colorant from mixed rare earth compounds without separating individual rare earth elements present therein and thus producing highly cost effective green colorant. The invention has potential applications in the Colorant Industry to produce environment friendly, highly cost effective and economically viable green colorant for surface coating applications.

BACKGROUND OF INVENTION

Inorganic colorants are widely employed in various applications such as paints, plastics, ceramics, rubbers, enamels and glasses. These pigments may impart coloristic properties and protect the coatings from the effects of visible as well as ultraviolet and infrared light. For such applications, their properties like chemical and thermal stability, dispersibility, chromaticity, tint strength and covering or masking power are particularly important criteria to be taken into account in the selection of a suitable colorant. Unfortunately, the inorganic pigments which are suitable for such applications and which are today actually employed on an industrial scale generally comprise toxic metals (cadmium, lead, chromium and cobalt) (References may be made to "High Performances Pigments," ed. by H. M. Smith, Wiley-VCH, Weinheim, 2002). The coloring scale of red and yellow inorganic pigments is completely covered by the cadmium sulfoselenides. In the blue and green range besides the ultramarine pigments there are primarily offered cobalt and chromium pigments. The use of above pigments is becoming increasingly strictly controlled, or even prohibited by legislation in many countries, due to their toxicity which is widely known to be very high. Thus serious economic and industrial need continues to exist for substitute inorganic pigments devoid of the above advantages and drawbacks.

Rare earth elements offer a vast opportunity for the development of environmentally secure alternatives for many of the eco-constrained colorants. Rare earths, because of their unique electronic configuration of partially filled f-orbitals, show unusual magnetic and optical properties. The intense coloration of rare earth based materials can arise from mostly charge transfer interactions between a donor and acceptor with the metal ion playing generally the role of an acceptor. Dopants based on rare earth elements in mixed oxide system offer an opportunity to tune the color response through the manipulation of energy gaps and delocalization phenomena in conduction and valence bands. Thus this phenomenon offers scope for design of colorants for specific applications.

However, the separation of rare earths offers a formidable challenge in the field of separation science in view of their similar physico-chemical properties. This in turn results in high costs for obtaining pure individual rare earths. Thus the present invention provides an economic option to the Rare Earth Industry due to the use of mixed rare earth compounds for the manufacturing of green colorant.

Pure rare earth oxides/compounds have been widely employed for the manufacturing of wide range of colorants in the Pigment Industry. U.S. Pat. No. 6,582,814, Jun. 24, 2003 describes a novel process for the synthesis of rare earth-transition metal oxide pigments, having the general formula: $(RE_xTm)O_y$, where RE is rare earth, Tm is transitional metal, x ranges from 0.08 to 12 and y ranges from x+1 to 2x+2, for use in plastics, paints, coatings, glass enamels and other materials with various advantages over the traditional pigment formulations. However, in this process green pigments are obtained using toxic metals like chromium.

Thermally/chemically stable and nontoxic inorganic pigments/colorants, characteristically green and well suited for the coloration of a wide variety of materials and substrates, for example, plastics, ceramics, etc. comprising at least one mixed oxide of the formula: $Y_2BaCuO_5$, $Sm_2BaCuO_5$ and $Yb_2BaCuO_5$ has been reported in the U.S. Pat. No. 6,284,033, Sep. 4, 2001.

New ecological green pigments based on Ca—Nd/Y—S system above mentioned application, in continuation with them have been well documented elsewhere for applications into plastics and paints (References may be made to M. D. Hernandez-Alonsoa, A. Gomez-Herrerob, A. R. Landa-Canovas, A. Duran, F. Fernandez-Martinez, L. C. Otero-Diaz, J. Alloys Compounds. 2001, 323-324, 297-302; E. U. Garrote, F. F. Martinez, A. R. L. Canovas, L. C. O. Diaz, J. Alloys Compounds. 2006, 418, 86-89; U.S. Pat. No. 5,501,733, Mar. 26, 1996).

The majority of the processes so far reported in the prior-art for the production of green inorganic pigments utilize pure rare earth compounds. However, recently Sreeram et. al. Reference may be made to WO2006/067799 A1, Jun. 29, 2006, discloses a process for the preparation of green inorganic colorant by employing mixed rare earth compounds (cerium in the range: 40-45% w/w, praseodymium in the range: 4-6% w/w, lanthanum in the range: 15-25% w/w, neodymium in the range: 15-20% w/w and other rare earths to a maximum of 5%) and nickel carbonate. However, the main drawback of this process is not economical and not environmental friendly as it contains nickel as toxic element.

There is no prior information available on the use of mixed rare earth compounds by suitable combination with molybdenum for the synthesis of green pigment.

OBJECTIVES OF THE INVENTION

The main object of the present invention is to provide a new inorganic green colorant having a general formula $RE_2MoO_6$ (where RE is mixed rare earth metal and Mo is molybdenum metal) from mixed rare earth compounds selected from carbonate of rare earth elements having atomic number in the range of 57 to 66 and having a composition of at least lanthanum in the range of 43-45% w/w, neodymium in the range of 33-35% w/w, praseodymium in the range of 9-10% w/w, samarium in the range of 4-5% w/w and other rare earths to a maximum of 5% w/w and ammonium molybdate.

Another objective of the present invention is to provide a green pigment which is economically viable which obviates the limitations of the Rare Earth Industry.

Yet another objective of the present invention is to provide toxic metal free inorganic green colorant as alternative to the existing toxic green colorants, so as they are environmental friendly.

Still another objective of the present invention is to provide colorants that can be used to form colored objects or coatings through their use in paints, plastics, glasses, ceramics etc.

SUMMARY OF THE INVENTION

Accordingly, the present invention provides a process for the preparation of green inorganic colorant from mixed rare earth and molybdenum compounds, comprising the steps:

a) homogenizing mixed rare earth carbonate and ammonium molybdate.

b) calcination of the homogenate obtained in step a) in air atmosphere to obtain particles of green inorganic colorant, c) cooling and subsequent reduction of particle size.

In an embodiment of the present invention, the mixed rare earth carbonate used is mixture of the rare earth elements having atomic number in the range of 57 to 66 and having a composition of at least lanthanum in the range of 43-45% w/w, neodymium in the range of 33-35% w/w, praseodymium in the range of 9-10% w/w, samarium in the range of 4-5% w/w and other rare earths to a maximum of 5% w/w.

In another embodiment of the present invention, the calcination temperature is in the range of 900° C.-1100° C.

In another embodiment of the present invention, the time for calcination is in the range of 3-6 h with a rate of heating of 10° C./min.

In another embodiment of the present invention, the green inorganic colorant, which comprises mixed oxides of rare earth elements and molybdenum. Said green inorganic colorant obtained, has a general formula $RE_2MoO_6$ (where RE is mixed rare earth metal and Mo is molybdenum metal).

In another embodiment of the present invention, in the green inorganic colorant the mixed rare earth metal content is 66.66 mol % and molybdenum metal content is 33.34 mol % of total metal content of the compound of formula $RE_2MoO_6$.

In an embodiment of the present invention, the green inorganic colorant is of formula $RE_2MoO_6$. The mixed rare earth metal content is 66.66 mol % and molybdenum metal content is 33.34 mol % of total metal content of the compound of formula $RE_2MoO_6$, has chromaticity coordinates as per the CIE 1976 colour scales at different temperatures are 900° C., $L^*=79.54$, $a^*=-7.16$, $b^*=20.90$;
1000° C., $L^*=83.79$, $a^*=-9.58$, $b^*=29.97$;
1100° C., $L^*=82.44$, $a^*=-10.13$, $b^*=36.44$ In another embodiment of the present invention the particle size of the green inorganic colorant of formula $RE_2MoO_6$ is in the range of 9-11 microns.

In yet another embodiment of the present invention the green inorganic colorant of formula $RE_2MoO_6$ comprises of a tetragonal crystal structure.

In yet another embodiment of the present invention a process for the preparation of a green inorganic colorant comprising the steps of homogenizing the mixture of mixed rare earth carbonate (72.88% w/w) and ammonium molybdate (27.12% w/w) for 1-2 h by conventional ball mill, calcination at a temperature in the range of 900° C.-1100° C. in air atmosphere for a period of about 3-6 hrs. The rate of heating was maintained at 10° C./min.

Still in another embodiment of the present invention a process for colouring of a substrate material, comprising the step of adding to said material a colouring amount of a green inorganic colorant in an amount of 5% by weight.

In another embodiment of the invention material is selected from the group consisting of poly methacrylate, organic polymers such as plastics, glasses, ceramics, paints, textiles.

In another embodiment of the invention, an inorganic green colorant which is toxic metal free as alternative to the existing toxic green colorants, so as they are environmental friendly.

BRIEF DESCRIPTION OF THE FIGURES

For a better understanding of the invention an exemplary embodiment is described below considered together with the figures in which.

DETAILED DESCRIPTION OF THE INVENTION

The present invention provides a novel process for the preparation of green inorganic colorant from mixed rare earth and molybdenum compounds. The process involves homogenizing mixed rare earth compounds, which comprises mixed rare earth carbonate of rare earth elements having atomic number in the range of 57 to 66 and having a composition of at least lanthanum in the range of 43-45% w/w, neodymium in the range of 33-35% w/w, praseodymium in the range of 9-10% w/w, samarium in the range of 4-5% w/w and other rare earths to a maximum of 5%, mixed with a metal ion preferably ammonium molybdate via solid state route.

The mixed rare earth carbonate (72.88% w/w) and ammonium molybdate (27.12% % w/w) are mixed in the stoichiometric ratio and heated at a temperature in the range of 900-1100° C. for 3-6 h and cooled to 35° C. The rate of heating was maintained at 10° C./min. The calcined mass after grinding with mortar and pestle to reduce the particle size to not more than 50 microns was characterized for its phase purity and optical properties.

The obtained powders were examined by means of X-ray powder diffraction (XRD) using Ni filtered CuKα1 radiation with a Philips X'pert Pro diffractometer. Morphological analysis was performed by means of scanning electron microscope with a JEOL JSM-5600LV SEM. Optical reflectances of the powder was measured with UV-vis spectrophotometer (Shimadzu, UV-2450) using barium sulphate as a reference.

The color values are measured on the CIE (Commission Internationale de l'Eclairage) scale, represented by $L^* a^* b^*$. The values $a^*$ (the axis red-green) and $b^*$ (the axis yellow-blue) indicate the color hue. The value $L^*$ represents the lightness or darkness of the color as related to a neutral grey scale.

In one aspect, the invention provides the preparation of green colorant by using the raw materials which are not exotic, are relatively inexpensive, and do not require complicated synthesis methods.

The present invention provides rare earth molybdate green pigments which may be used as colorant to plastics or organic coating compositions, textiles, glass and ceramic coating compositions, and the like. A further aspect of the present invention is to provide a method for coloring a substrate. The method includes the steps of providing a substrate which is poly (methyl methacrylate), and adding rare earth molybdate green pigment to the substrate. In this application, the amount of pigment used was 5% by weight relative to the substrate.

The following examples are given to illustrate the process of the present invention and should not be construed to limit the scope of the present invention.

Example 1

Figure 1:
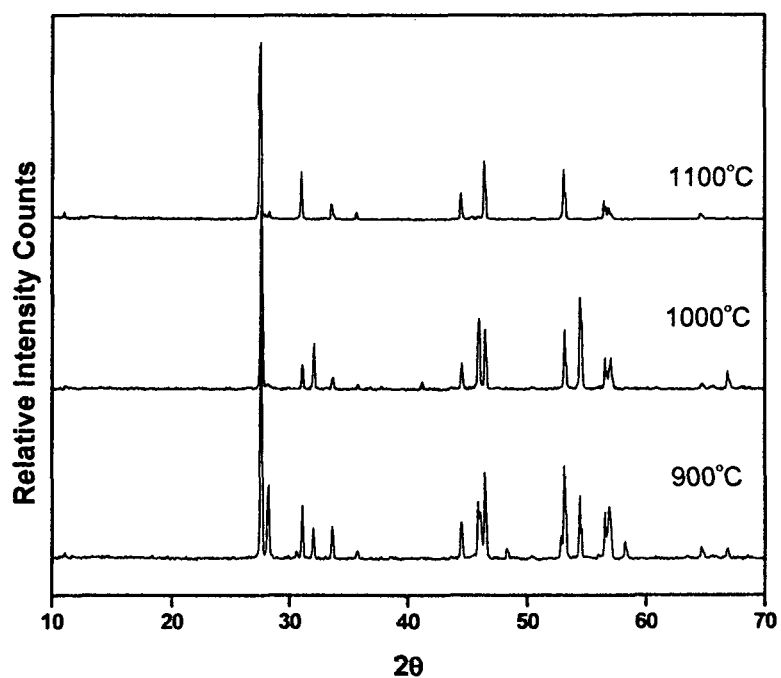
FIG. 1. Powder X-ray diffraction patterns of mixed rare earth molybdate.
Figure 2:
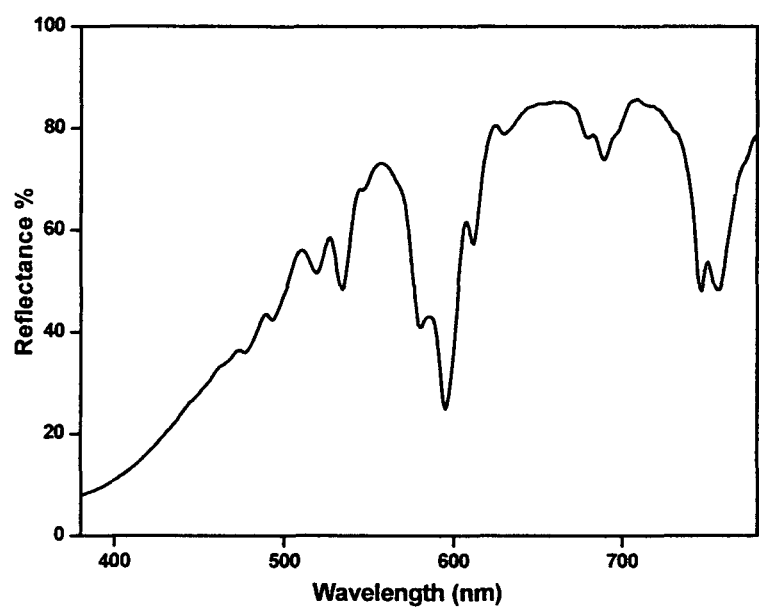
FIG. 2. Diffuse reflectance spectrum of mixed rare earth molybdate.

The mixed rare earth carbonate (72.88 gms.) of rare earth elements having atomic number in the range of 57 to 66 and having a composition of at least lanthanum in the range of 43-45% w/w, neodymium in the range of 33-35% w/w, praseodymium in the range of 9-10% w/w, samarium in the range of 4-5% w/w and other rare earths to a maximum Of 5% w/w (Supplied by M/s Indian Rare Earths Limited, Mumbai under the trade name Didymium Carbonate) and ammonium heptamolybdate (27.12 gms.); purity 99.9%, Supplied by M/s Sigma Aldrich) were thoroughly mixed in an agate mortar with a pestle. The mixture was calcined at 900° C. for 3 h in air. The rate of heating was maintained at 10° C./min. The heated mixture is then cooled to 35° C., ground to a particle size less than 50 microns in a mortar and pestle to obtain, light green colored pigment. XRD pattern of the compound depicted in FIG. 1 indicates the incompletion of reaction at this temperature. The rare earth molybdate green pigment possesses a tetragonal structure. Morphological analysis performed by means of scanning electron microscope indicates the homogenous nature of the colorant obtained. Optical reflectance of the powder was measured with UV-vis spectrophotometer (Shimadzu, UV-2450) using barium sulphate as a reference and is shown in FIG. 2. The chromaticity coordinates, determined by the CIE-LAB 1976 color scales are $L^*=79.54$, $a^*=-7.16$, $b^*=20.90$.

Example 2

The mixed rare earth carbonate (72.88 gms.) of rare earth elements having atomic number in the range of 57 to 66 and having a composition of at least lanthanum in the range of 43-45% w/w, neodymium in the range of 33-35% w/w, praseodymium in the range of 9-10% w/w, samarium in the range of 4-5% w/w and other rare earths to a maximum of 5% w/w (Supplied by M/s Indian Rare Earths Limited, Mumbai under the trade name Didymium Carbonate) and ammonium heptamolybdate (27.12 gms.); purity 99.9%, Supplied by M/s Sigma Aldrich) were thoroughly mixed in an agate mortar with a pestle. The mixture was calcined at 1000° C. for 3 h in air. The rate of heating was maintained at 10° C./min. The heated mixture is then cooled to 35° C. ground to a particle size less than 50 microns in a mortar and pestle to obtain light green colored pigment. The obtained powders were examined by means of X-ray powder diffraction (XRD) using Ni filtered CuKα1 radiation with a Philips X'pert Pro diffractometer. The resulting pigment exhibited much better stability (FIG. 1) and color properties than the pigment illustrated in Example 1. Optical reflectance of the powder was measured with UV-Vis spectrophotometer (Shimadzu, UV-2450) using barium sulphate as a reference. The obtained colorant had $L^*$ $a^*$ $b^*$ values of 83.79, -9.58 and 29.97, respectively on the CIE-LAB 1976 color scales.

Example 3

The mixed rare earth carbonate (72.88 gms.) of rare earth elements having atomic number in the range of 57 to 66 and having a composition of at least lanthanum in the range of 43-45% w/w, neodymium in the range of 33-35% w/w, praseodymium in the range of 9-10% w/w, samarium in the range of 4-5% w/w and other rare earths to a maximum of 5% w/w (Supplied by M/s Indian Rare Earths Limited, Mumbai under the trade name Didymium Carbonate) and ammonium heptamolybdate (27.12 gms.); purity 99.9%, Supplied by M/s Sigma Aldrich) were thoroughly mixed in an agate mortar with a pestle. The mixture was calcined at 1100° C. for 6 h in air. The rate of heating was maintained at 10° C./min. The heated mixture is then cooled to 35° C., ground to a particle size less than 50 microns in a mortar and pestle to obtain-light green colored pigment. The heating was done at a rate of 10° C./min and the heated mixture was then cooled to 35° C. The calcined mass was ball milled using a mortar and pestle to reduce the particle size. The product exhibited good phase purity and color properties as analyzed by XRD and diffused reflectance studies. XRD pattern of the compound depicted in FIG. 1 is in good agreement with the powder X-ray diffraction file: PDF no. 24-550. The obtained intense green colored pigment is having a tetragonal crystal structure. The particle size of the pigment was analyzed in water using calgon as the dispersing agent by a particle size distribution analyzer (CILAS 930 Liquid). The pigment particle size varies in the range of 9-11 microns. Optical reflectance of the powder was measured with UV-Vis spectrophotometer (Shimadzu, UV-2450) using barium sulphate as a reference is shown FIG. 2. The obtained colorant had a green hue and $L^*$ $a^*$ $b^*$ values of 82.44, -10.13 and 36.44, respectively on the CIE-LAB 1976 color scales. The pigment can be applied in plastics, paints, ceramics and the like.

Figure 3:
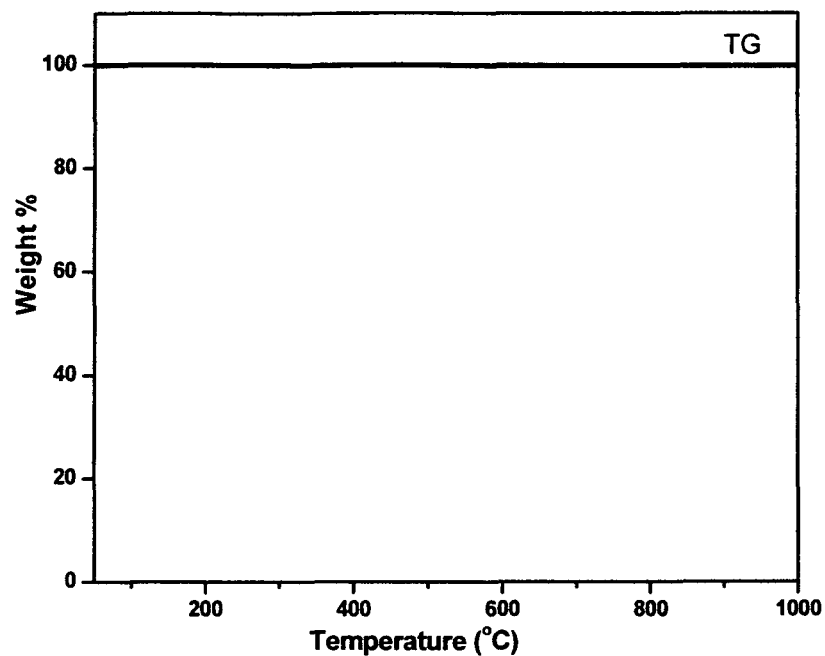
FIG. 3. Thermogram of $RE_2MoO_6$ green pigment

Thermogravimetric analysis of the typical pigment $RE_2MoO_6$ was carried out in the temperature range of 50-1000° C. using Pyris Diamond TG/DTA Perkin Elmer make. It is clear from the thermogram analysis that the pigment is thermally stable up to 1000° C. (FIG. 3).

The typical pigment $RE_2MoO_6$ was tested for its acid and alkali resistance. A pre-weighed quantity of the pigment was treated with 3% $HCl/H_2SO_4/HNO_3$ and NaOH, and soaked for half an hour with constant stirring using a magnetic stirrer. The pigment was then filtered, washed with water, dried and weighed. No weight loss was noticed for all the acids and alkali tested. The typical $L^*$ $a^*$ $b^*$ values after acid and alkali resistance tests were found to be ($L^*=83.96$; $a^*=-9.15$; $b^*=35.95$ and $L^*=82.09$; $a^*=-9.22$; $b^*=36.10$ for $HNO_3$ and NaOH, respectively) same as that of pigment powder sample. Thus the designed green pigment is found to be chemically and thermally stable.

Example 4

5 weight % of the typical pigment sample, $RE_2MoO_6$ (as synthesized in Example 3) and 95 weight % of Poly(methyl methacrylate) (Sigma Aldrich) was dispersed in a Cold Curing Liquid (Acralyn 'R', Supplied by M/s. Asian Acrylates, Mumbai) and the resultant mixture was ultrasonicated for 10 min to ensure complete homogenization. Then the pigment dispersion was slowly evaporated at 30° C. and converted into a thick paste. The paste after 2 h of curing was compressed uniaxially into the form of cylindrical discs using a hydraulic press (Lawrence & Maya, India) at a pressure of 25 MPa. Both sides of the pigmented polymer were lapped using a fine grade emery sheet for obtaining a polished surface. Optical reflectance of the prepared pigmented substrate material was measured with UV-Vis spectrophotometer (Shimadzu, UV-2450) using barium sulphate as a reference. The obtained substrate material had a green hue and L* a* b* values of 63.82, −7.76 and 35.56, respectively on the CIE-LAB 1976 color scales.

Figure 4:
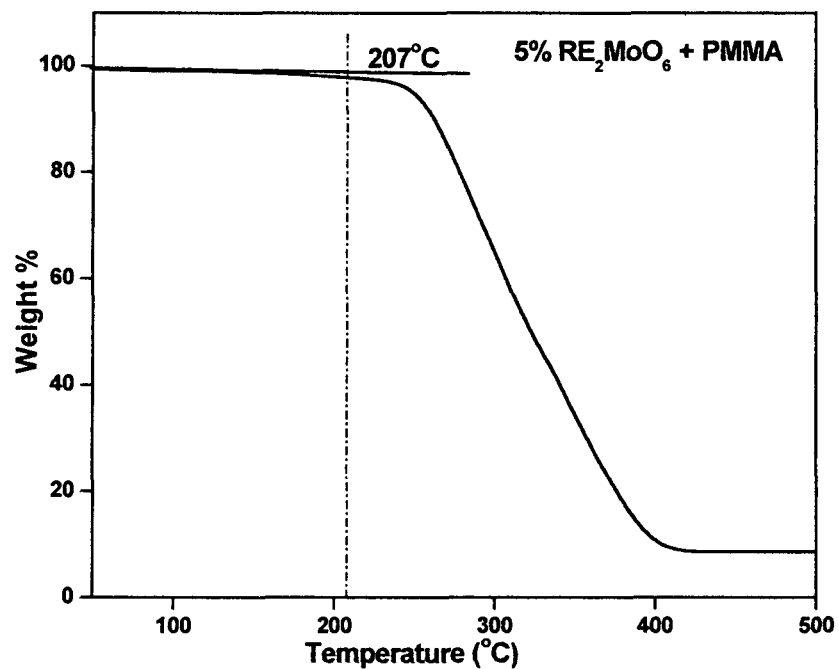
FIG. 4. Thermogram of 5% green pigment in PMMA substrate

Thermogravimetric analysis of the typical colored substrate material was carried out in the temperature range of 50-500° C. using Pyris Diamond TG/DTA Perkin Elmer make. It is clear from the thermogravimetric analysis that the colored substrate material is found to be thermally stable up to 200° C. (FIG. 4).

ADVANTAGES

The invention has potential applications in the Colorant Industry to produce environment friendly, highly cost effective and economically viable green colorant for surface coating applications.

I claim:

1. A process for the preparation of green inorganic colorant from mixed rare earth and molybdenum compounds, comprising the steps:
    a) homogenizing a mixed rare earth carbonate and ammonium molybdate;
    b) calcinating the homogenate obtained in step a) in air atmosphere; and
    c) cooling and subsequent reduction of particle size,
    wherein the mixed rare earth carbonate used in step a) is a mixture of rare earth elements having atomic number in the range of 57 to 66 and having a composition of at least lanthanum in the range of 43-45% w/w, neodymium in the range of 33-35% w/w, praseodymium in the range of 9-10% w/w, samarium in the range of 4-5% w/w and other rare earths to a maximum of 5% w/w.

2. The process as claimed in claim 1, wherein calcination temperature in step b) is in the range of 900° C.-1100° C.

3. The process as claimed in claim 1, wherein time for calcination in step b) is in the range of 3-6 h with a rate of heating of 10° C./min.

4. A green inorganic colorant, which comprises mixed oxides of rare earth elements and molybdenum, wherein said green inorganic colorant obtained, has a general formula $RE_2MoO_6$ (where RE is mixed rare earth metal and Mo is molybdenum metal), wherein the colorant is obtained from a mixed rare earth carbonate which is a mixture of the rare earth elements having atomic number in the range of 57 to 66 and having a composition of at least lanthanum in the range of 43-45% w/w, neodymium in the range of 33-35% w/w, praseodymium in the range of 9-10% w/w, samarium in the range of 4-5% w/w and other rare earths to a maximum of 5% w/w.

5. The green inorganic colorant as claimed in claim 4, wherein said colorant has chromaticity coordinates determined as per the CIE 1976 color scales at different temperatures are
    900° C., L*=79.54, a*=−7.16, b*=20.90;
    1000° C., L*=83.79, a*=−9.58, b*=29.97;
    1100° C., L*=82.44, a*=−10.13, b*=36.44.

6. The green inorganic colorant as claimed in claim 4, wherein the particle size of said colorant is in the range of 9-11 microns.

7. The green inorganic colorant as claimed in claim 4, wherein said colorant comprises of a tetragonal crystal structure.

8. A process for colouring a substrate material, comprising the step of adding to said material a colouring amount of a green inorganic colorant as claimed in claim 4, in an amount in the range of 5% by weight.

9. The process as claimed in claim 8, wherein the material is selected from the group consisting of poly methacrylate, organic polymers, plastics, glasses, ceramics, paints, and textiles.

* * * * *